United States Patent [19]

Hetra, Jr. et al.

[11] 4,364,468
[45] Dec. 21, 1982

[54] APPARATUS FOR CO-ORDINATING INDEXING MOVEMENT OF A CONVEYOR WITH PIVOTING OF A KICKOUT ARM ADJACENT THE DELIVERY END THEREOF

[75] Inventors: Andrew A. Hetra, Jr., Pittsburgh; Charles W. Jacob, Crafton, both of Pa.

[73] Assignee: United States Steel Corporation, Pittsburgh, Pa.

[21] Appl. No.: 241,190

[22] Filed: Mar. 6, 1981

[51] Int. Cl.³ .................................. B65G 25/00
[52] U.S. Cl. ............................ 198/489; 198/575; 198/614
[58] Field of Search ............... 198/859, 575, 489, 474, 198/488, 774, 614

[56] References Cited

U.S. PATENT DOCUMENTS

| | | | |
|---|---|---|---|
| 1,714,131 | 5/1929 | McHugh | 198/489 |
| 3,130,830 | 4/1964 | Allbeson | 198/774 |
| 3,587,823 | 6/1971 | Hartz | 198/489 |
| 4,220,241 | 9/1980 | DeCray | 198/774 |

*Primary Examiner*—Joseph E. Valenza
*Assistant Examiner*—Dennis J. Williamson
*Attorney, Agent, or Firm*—William F. Riesmeyer, III

[57] ABSTRACT

This invention relates to apparatus for coordinating the indexing movement of a conveyor with pivotal movement of a kickout arm for removing workpieces from its delivery end. A double acting fluid powered cylinder alternately indexes the loop and pivots the kickout upon reciprocating movement of first and second piston rods thereof. Preferably, a rack is provided extending axially from the first of the rods. A pinion engages the rack and is operatively connected and disconnected from the loop by a clutch upon stroke of the rod in opposite directions. A collet operatively connects the second piston rod to the kickout arm when the loop is at rest and disconnects said arm therefrom when the loop is being driven.

7 Claims, 13 Drawing Figures

APPARATUS FOR CO-ORDINATING INDEXING MOVEMENT OF A CONVEYOR WITH PIVOTING OF A KICKOUT ARM ADJACENT THE DELIVERY END THEREOF

BACKGROUND OF THE INVENTION

This invention relates to drive apparatus for a conveyor, and particularly to apparatus for coordinating indexing movement of the conveyor with pivoting of a kickout arm adjacent the delivery end thereof.

In the hot dip galvanizing of pipe, pipe are removed one at a time from a pot of molten zinc and then placed laterally on a transfer conveyor. The conveyor transports them by rolling movement at a prescribed rate to a steam blowout station of removing excess spelter from their interior surface. In the past a walking beam conveyor has been used, but at high production rates, was erratic and did not consistently align the pipes properly at the blowout station. This resulted in the steam blowout nozzles missing the pipe and thus resulting in rejections due to excess spelter. Also, the cylinder operated kickout for removing the pipe from the blowout station did not return fast enough to its neutral position. Consequently, pipe would become lodged between the kickout arm and blowout station saddle. When this occurred, the pipe had to be removed manually, causing a shutdown and loss of production as well as reject material.

An example of a steam blowout station and conveying apparatus is shown in U.S. Pat. No. 2,893,348. Coordinating article transfer from one conveyor to another is shown in U.S. Pat. No. 3,587,823 Hartz. Neither reference discloses apparatus providing positive indexing movement of a conveyor and coordinating that movement with a pivotal kickout. It is therefore a primary object of this invention to provide apparatus for accomplishing this latter function and overcoming the disadvantages above recited.

SUMMARY OF THE INVENTION

According to this invention drive apparatus is provided for coordinating movement of an indexing conveyor with a kickout arm and includes a double acting fluid powered cylinder having first and second simultaneously reciprocable piston rods extending from opposite ends thereof. The rods each have the axis thereof lying in the plane of the endless conveyor loop. Means are connected to the first of the rods for driving the loop upon movement of said rod in one of the directions of movement thereof. A kickout arm is located adjacent the delivery end of the conveyor for removing workpieces from it. It has an extension for rotating the arm about its pivot axis. Means operatively connect and disconnect the kickout arm to the second of the cylinder rods so that reciprocation of said rod will pivot the arm only while the conveyor loop is at rest between the intermittent movements of the conveyor. Preferably, this latter means is an expandable collet.

The apparatus may also preferably include a quick return means to return the kickout arm to its lowered position prior to initiation of the next indexing movement of the loop. Most preferably, such apparatus will also include a means for decelerating the return of the kickout in the latter portion of its travel to the lowered position to minimize shock and bounce as it contacts a stop.

DESCRIPTION OF THE PREFERRED EMBODIMENT

Although applicable to any type of indexing conveyor, the apparatus of this invention is illustrated as initially applied to a conveyor for transferring galvanized pipe from the molten bath to a steam blowout station. A description of the associated galvanizing apparatus is contained in U.S. Pat. No. 3,701,336, the specification of which is incorporated herein by reference.

Figure 1:
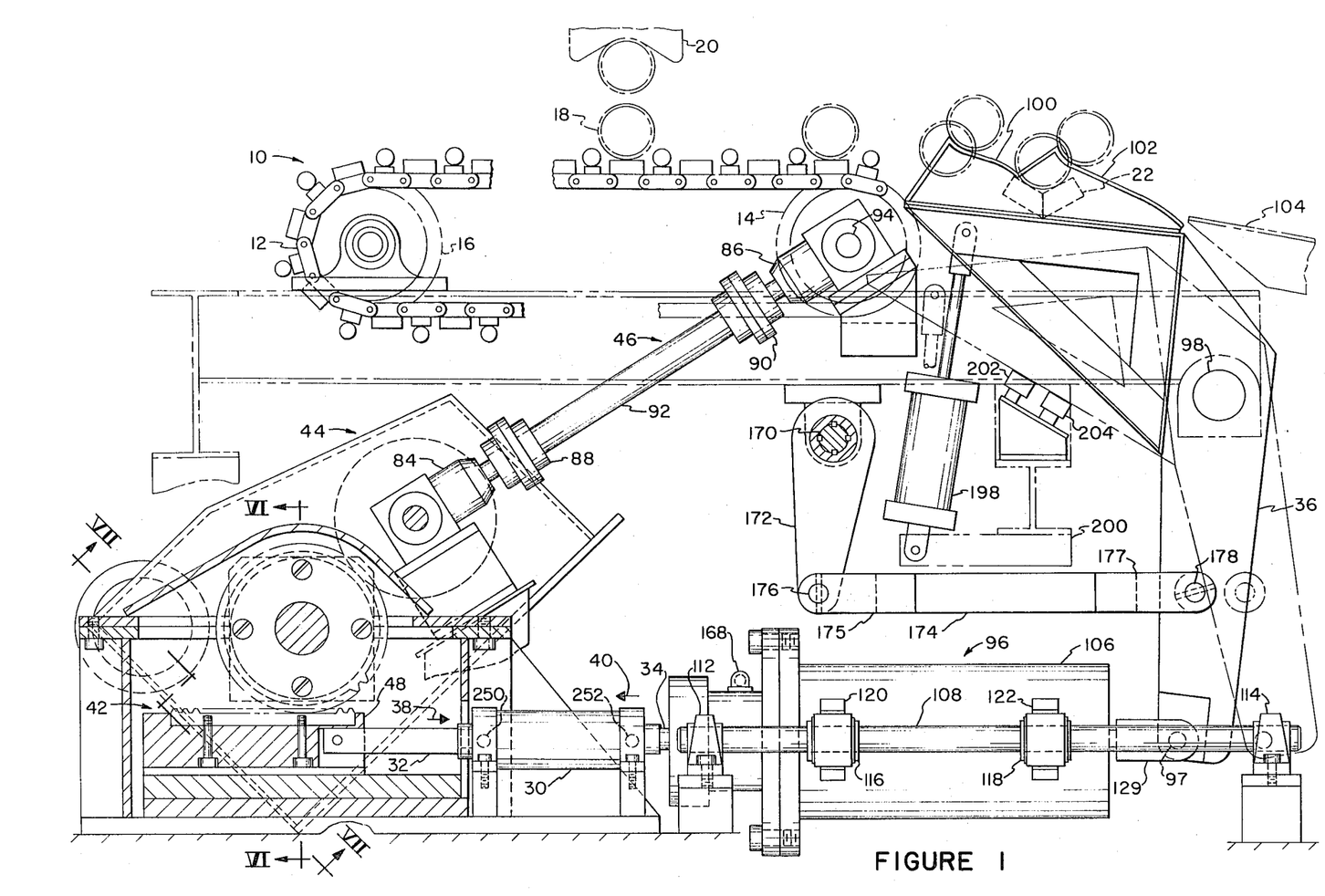
FIG. 1 is a partially sectioned side elevation view of the apparatus of this invention.

Referring to FIG. 1, conveyor 10 includes chain loop 12 mounted on driven sprocket 14 and idler 16. Although not shown, a plurality of spaced loops are provided for transferring pipes 18 as received from dragout rolls 20 to saddle 22 of the steam blowout station.

The apparatus of the instant invention includes double acting hydraulic cylinder 30 which has first and second piston rods 32, 34 extending from its opposite ends. Any commercially available hydraulic cylinder of this type may be used. Reciprocation of the piston moves the rods back and forth in unison. This fact is utilized to coordinate indexing of conveyor 10 with rotation of kickout arm 36 which transfers the pipes from the delivery end of the loop to the blowout saddle.

Movement of rod 32 in the direction 38 shown of FIG. 1 indexes the conveyor in one direction by apparatus to be described hereafter. Similarly, movement of rod 34 in the direction 40 on FIG. 1 rotates the kickout arm. Thus coordinated movement is obtained from a single prime mover.

Figure 6:
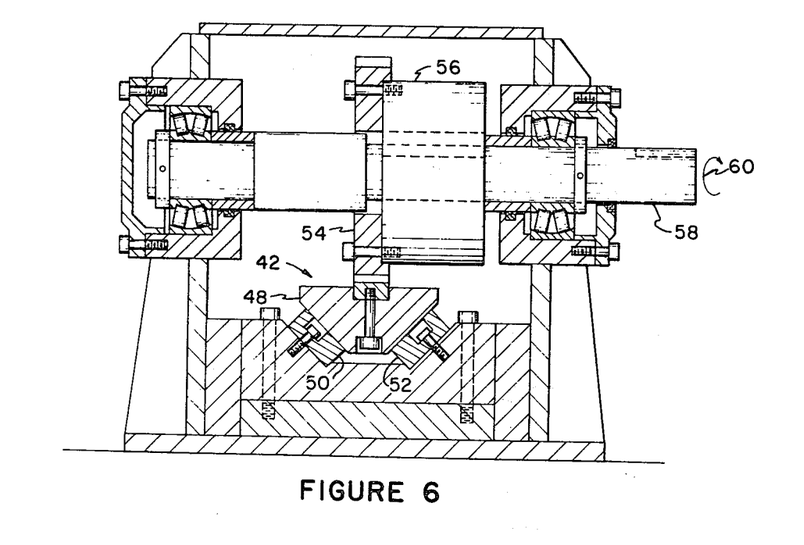
FIG. 6 is a view taken at VI—VI of FIG. 1.

Rod 32 is connected to rack and pinion assembly 42, which in turn drives three speed transmission 44, drive shaft assembly 46 and ultimately sprocket 14. Referring to FIG. 6, assembly 42 includes rack 48 which is of triangular cross section and rests on bars 50, 52 made of naval bronze material for reducing friction and wear on the rack. Pinion 54 engages the rack continuously and is oscillated back and forth. Sprag clutch 56 connects the pinion to shaft 58. It automatically engages upon rotation of the pinion in direction 60 and disengages when the pinion rotates in the opposite direction. We use a Model No. 800 HPI Series made by Formsprag Company, Warren, Mich. Shaft 58 is connected to input shaft 61 (FIG. 8) of transmission 44.

Figure 7:
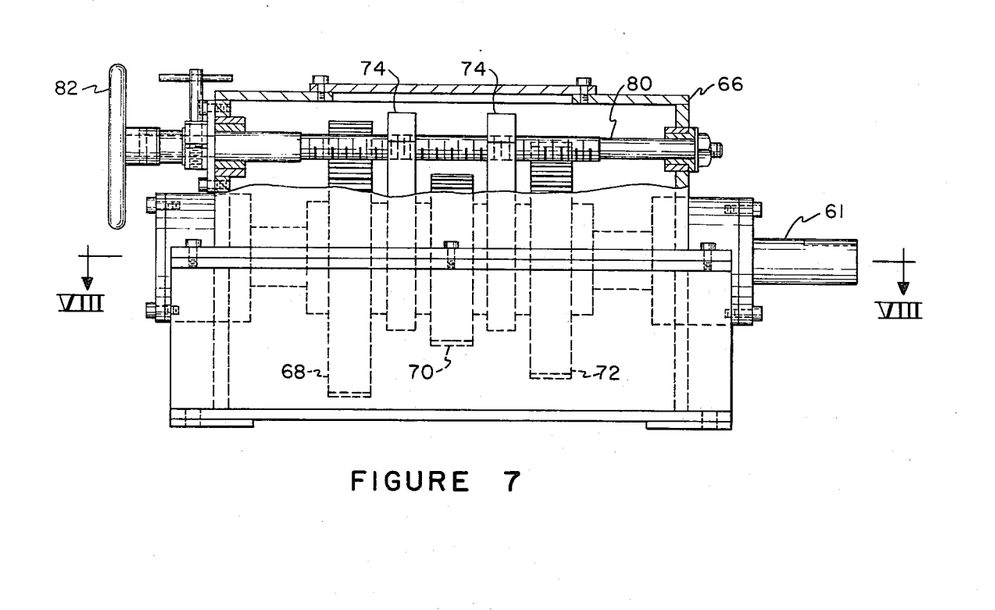
FIG. 7 is a view taken at VII—VII of FIG. 1.
Figure 8:
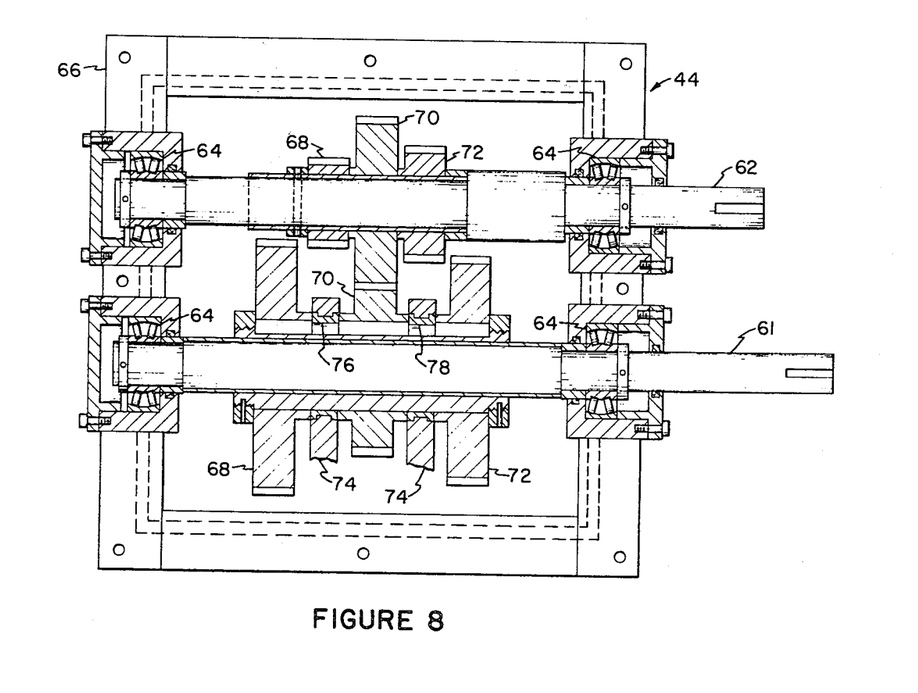
FIG. 8 is a view taken at VIII—VIII of FIG. 7.

Referring to FIGS. 7 and 8, transmission 44 includes input and output shafts 61, 62 respectively, each mounted in bearings 64 at opposite ends of housing 66. Each shaft has three gear sets 68, 70 and 72. The gears of each set are selectively engageable or disengageable by sliding axial movement on input shaft 61. Shifting forks 74 is attached to shaft 61 by flanges 76, 78. Fork 74 is mounted on threaded trasversing shaft 80 (FIG. 7) which when rotated by handwheel 82 causes fork 74 to move axially, shifting gear sets. Such shifting mechanism provides positive movement of the gears without slippage and is especially suited for applications where the transmission is tilted from the horizontal. Such is the case on this galvanized pipe conveyor. The other endless loops not shown are located at successively higher elevations to allow molten zinc to drain from the pipes as they are conveyed. Thus the transmission is located in a tilted position not illustrated in the FIGS. 7 and 8.

Output shaft 62 of the transmission is connected to drive shaft assembly 46 (FIG. 1) which includes gearboxes 84, 86 connected by couplings 88, 90 to shaft 92 which in turn drives shaft 94 connected to srocket 14. This completes the drive mechanism for indexing the chain loop conveyor. Preferably, means is also provided to stop the loop positively when the rack is completely extended. This may be accomplished by a conventional air brake and torque limiter provided for example on the shaft connecting the transmission output shaft to gearbox 84. This is not illustrated in the Figures.

Rod 34 of cylinder 30 is connected to collet assembly 96 which in turn is pivotally attached by pin 97 to kickout arm 36. Kickout arm 36 is pivotally mounted on shaft 98 and has two workpiece receiving surfaces 100, 102. Each of these surfaces slopes downwardly to permit two workpieces to roll simultaneously from (a) the delivery end of the conveyor to the steam blowout station, and (5) from the steam blowout station to exit ramp 104 when the kickout arm is raised.

Figure 11:
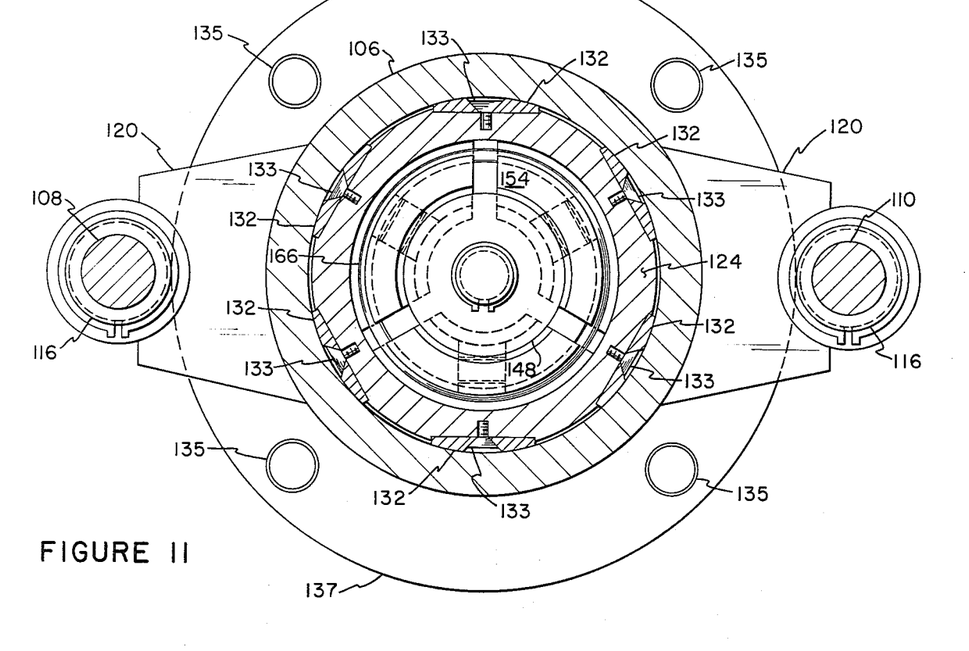
FIG. 11 is a section taken at XI—XI of FIG. 3.
Figure 12:
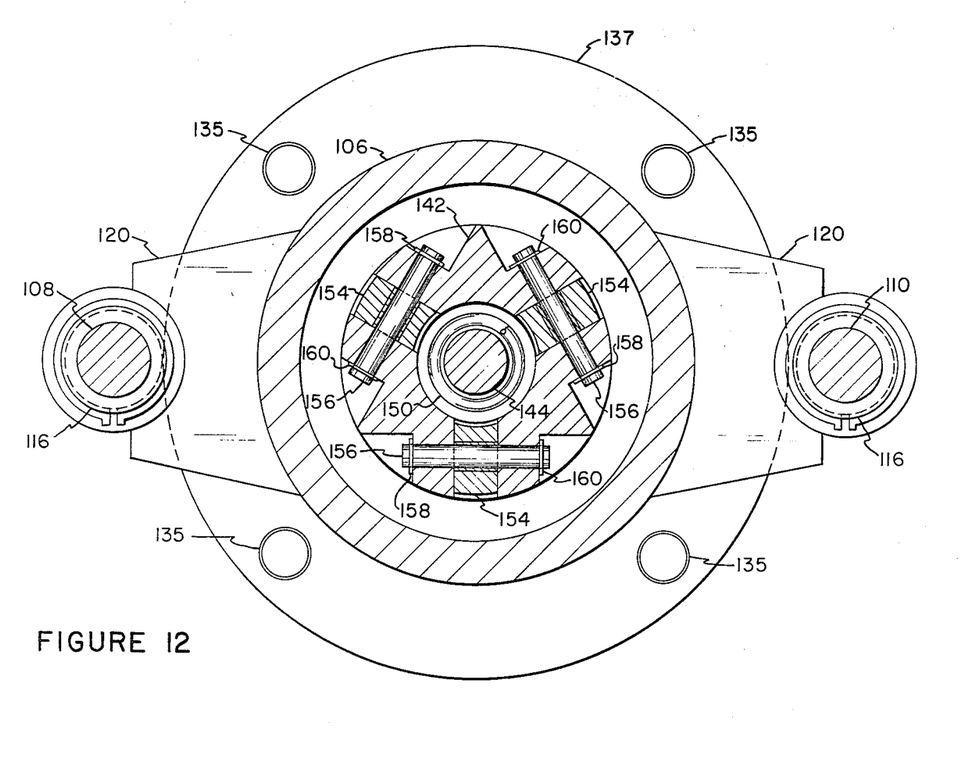
FIG. 12 is a section taken at XII—XII of FIG. 5.

Collet assembly 96 includes housing 106 which is slidably movable back and forth on parallel guide rods 108, 110 shown in FIGS. 11, 12. Each rod is mounted in support blocks 112, 114. Sleeves 116, 118 for guiding movement of the housing are attached to it by brackets 120, 122. Similar bearings, sleeves and brackets are mounted on rod 110 on the opposite side of housing 106 from that shown in FIG. 1.

Figure 2:
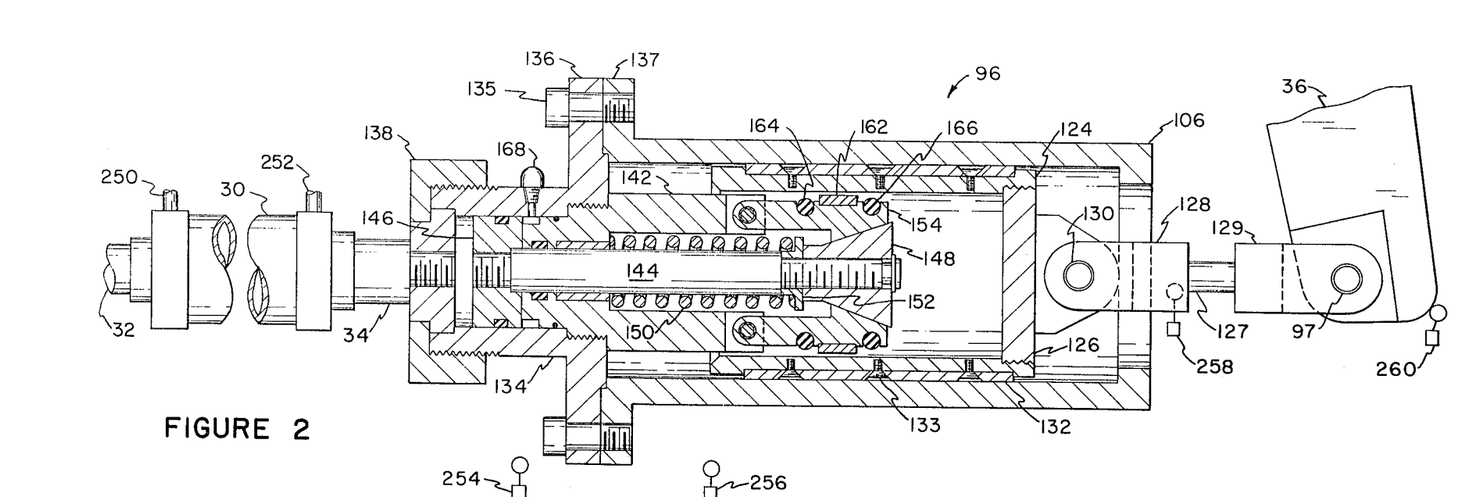
FIG. 2 is an enlarged partially sectional side elevation view of the expandable collet showing a first step in the sequence of operation of the apparatus.

Referring to FIG. 2, collet assembly 96 includes an outer member in the form of housing 106, which as previously described is slidably movable back and forth in axial directions, and inner member 124 which (a) is slidably movable with housing 106 when joined thereto, or (b) is separately movable in the axial direction within housing 106 when not joined to it. Inner member 124 has a head 126 attached to its outer end. Connecting rod 127 has clevises 128, 129 at its opposite ends. Pins 130, 97 inserted through clevises 128, 129 respectively, connect rod 127 to the collet and kickout arm. A plurality of arcuate wear bars 132 (FIG. 11) are mounted on the outer periphery of member 124, and are secured to it by set screws 133.

Housing 106 has outer sleeve 134 secured to it by bolts 135 mounted in mating flanges 136, 137. Threaded cap assembly 138 is secured to and closes one end of outer sleeve 134. A threaded bore in cap assembly 138 receives threaded end of rod 34 of cylinder 30.

Means is provided for selectively joining inner member 124 to outer housing 106 for consonant movement of the two or disconnecting them for separate movement. This includes inner sleeve 142 having threaded shoulder mounted in threaded groove of outer sleeve 134. The two sleeves and housing are thus reciprocably movable with rod 34 of cylinder 30. Rod 144 extends axially through a longitudinal bore of inner sleeve 142. Plunger 146 is mounted on the threaded end of rod 144 in the bore of outer sleeve 134. An expansion member 148 of frustoconical shape is mounted on the threaded end of rod 144 opposite from that on which the plunger is mounted. A compression spring 150 is mounted helically on the exterior of rod 144 and abuts the shoulder of a counterbore in sleeve 142 and retainer collar 152. Three peripheral segments 154 are each pivotally attached at 120 degree spacing to inner sleeve 142 by pins 156 (FIG. 12) secured by clips 158, 160. Each segment has an insert 126 preferably of friction (brake) lining material for gripping the inner member 124 when the segments are spread by movement of expansion member 148. Garter springs 164, 166 of spring steel material extend along annular grooves of the segments tending to retain them in collapsed position. Segments 154 are caused to spread and collapse by axial movement of expansion member 148. Hydraulic fluid is injected into and exhausted from port 168 of outer sleeve 134. It may also be necessary to inject air or hydraulic fluid on the opposite side of the plunger head to force it to move in the other direction if sufficient force is not provided by spring 150. Plunger 146 and therefore expansion member 148 as well as rod 144 are thus caused to move back and forth within the bores of outer and inner sleeves 134 and 142. It will be apparent that when segments 154 are spread inner member 124 and housing 106 are joined for movement in unison with movement of rod 34 of cylinder 30. Moreover, when segments 154 are collapsed inner member 124 and housing 106 are not joined and are therefore each independent of movement of the other.

Figure 9:
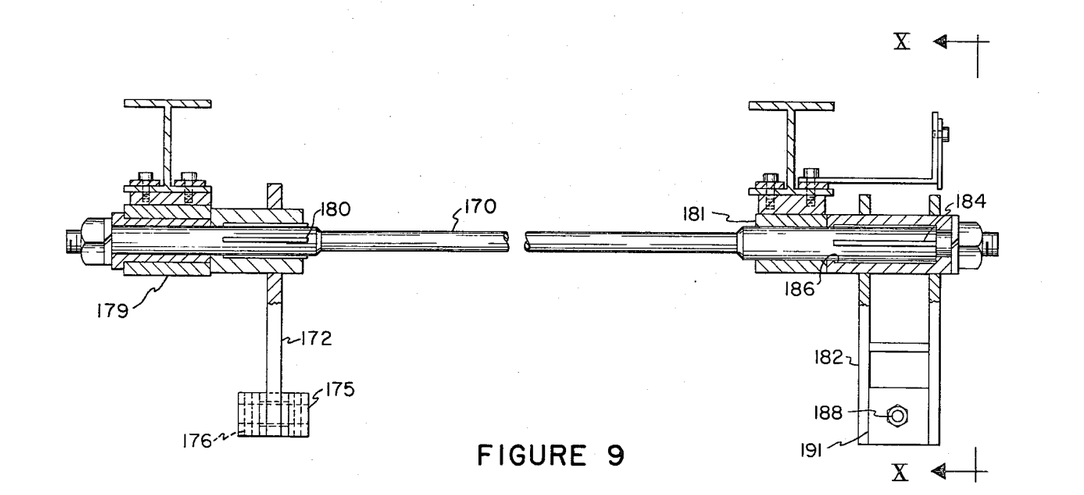
FIG. 9 is an enlarged side elevation view of the torsion bar quick return for the kickout arm.
Figure 10:
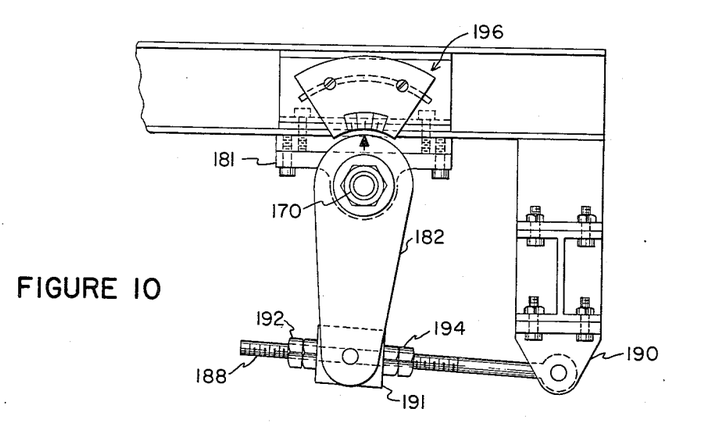
FIG. 10 is a view taken at X—X of FIG. 9.

Quick return means is provided for bringing kickout arm 36 back to the lowered position after it is raised and then inner member 124 of the collet is disengaged from housing 106 as above described. This is necessary to insure that the kickout will be back in proper position for receipt of the next workpiece from the delivery end of the conveyor before the loop is indexed. The quick return apparatus includes torsion bar 170 (FIG. 1) connected by crank 172 to spacer bar 174, which in turn is connected to kickout 36. Spacer bar 174 has clevises 175, 177 at each of its opposite ends and is pivotally attached to the crank and kickout respectively by pins 176, 178 extending through the clevises. Referring to FIGS. 9 and 10, torsion bar 170 is rotatably mounted in stationary housings 179, 181. Preferably a bar made of forged and heat treated AISI 8620 steel is used having the following properties: Rockwell C hardness 61-64, yield strength 120-150 ksi, and tensile strength 167-188 ksi. Bar 170 has a first splined portion 180 on which crank 172 is mounted. Crank 172 has a bore with grooves mateable with the splines of bar 170 so that the two are fixedly attached together. Means is provided for adjusting the degree of rotational stress created in bar 170 when the kickout is raised and thus its rate of return to the lowered position. This includes adjustable crank arm 182 fixedly attached to the opposite end of bar 170 from that to which crank 172 is secured. Bar 170 has a second splined portion 184 on which grooved bore 186 of arm 182 is mounted. The rotational position of arm 182 is controlled by threaded rod 188 (FIG. 10) which is pivotally attached to stationary bracket 190 at one end and extends through a hole in bracket 191 of the crank arm at the other end. Locknut sets 192, 194 are used to adjust the position of arm 182 on rod 188 as will be readily apparent from the drawings. Preferably a pointer and scale arrangement 196 are provided so that the relative position of the bar can be readily determined visually.

Means is also provided to slow return of the kickout arm in the final portion of its return travel to the lowered position. This prevents excessive shock and bouncing of the arm as it contacts stops controlling its alignment at the delivery end of the conveyor. The apparatus includes at least one adjustable shock absorber 198 (FIG. 1) pivotally attached to a frame 200. The piston rod of the shock is pivotally attached to kickout arm 36. We use a model AAHS 2×6-C made by Ace Controls, Inc. of Farmington, Mich. Various relief valves with different size orifices may be used to control the affect of the shock absorber on deceleration of kickout 36. Resilient bumper pads 202, 204 are also provided on fixed mounts to act as stops for the kickout and further reduce shock. Hard rubber or other compressible material may be used.

Figure 13:
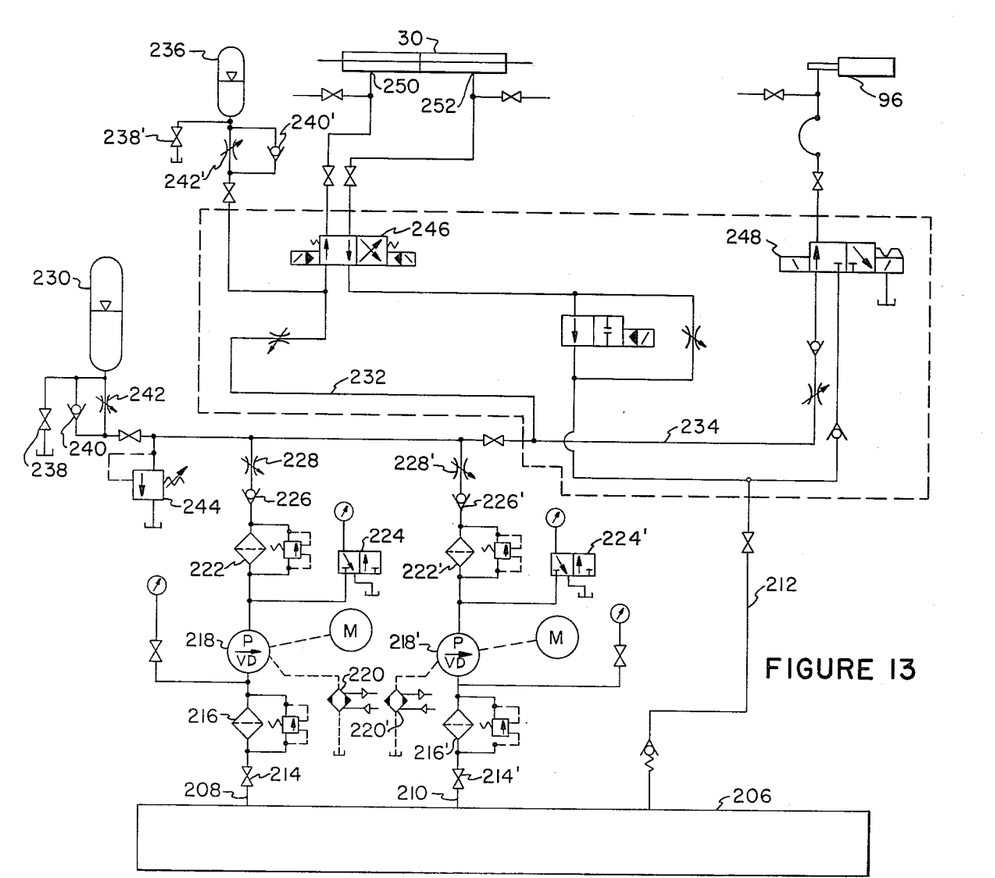
FIG. 13 is a schematic of the hydraulic system for operating the apparatus of the invention.

Referring to FIG. 13, the hydraulic controls for the collet 96 and double acting cylinder 30 are as follows: A hydraulic storage and supply tank 206 is provided and has primary feed line 208, spare feed line 210 and return line 212 connected to it. Each feed line has shutoff valves 214, 214', a filter and pressure bypass 216, 216', a variable capacity pump 218, 218', a hydraulic fluid cooler 220, 220' connected to the pump, a second filter and pressure bypass 222, 222' with a directional valve 224, 224' associated therewith; and finally check valves 226, 226' and flow control valves 228, 228'. An accumulator 230 boosts pressure from the feed lines to separate supply lines 232 and 234 to cylinder 30 and collet 96, respectively. Accumulator 236 boosts pressure in supply line 232. Each accumulator has a shutoff valve 238, 238', check valve 240, 240' and hand flow control valve 242, 242' as conventionally provided. A pilot operated adjustable pressure regulator valve 244 is provided downstream from accumulator 230. Supply lines 232 and 234 have solenoid actuated directional valves 246, 248 respectively. Valve 248 alternately switches from supply or exhaust modes as controlled by limit switches hereafter described. This controls movement of expansion member 148 in collet 96. The ports 250, 252 of cylinder 30 are connected to solenoid 246 which again switches from supply to exhaust modes as controlled by limit switches in a manner now to be described.

Referring again to FIGS. 2 through 5, limit switches 254, 256 are provided adjacent flanges 136, 137 of collet 96. Similarly, limit switches 258, 260 are provided adjacent housing 106 of the inner member 124 of the collet and kickout arm 36, respectively.

The sequence of operation is as follows:

FIG. 2 shows limit switch 260 engaged by kickout arm 36 indicating the kickout is in the lowered position. Fluid is being supplied to port 250 of cylinder 30 moving rack 48 in direction 38 (FIG. 1). When the rack moves in this direction clutch 56 is engaged and conveyor loop 12 is indexed. Simultaneously, outer member or housing 106 of the collet is moved in the same direction until limit switch 256 is engaged by collet flange 137.

Figure 3:
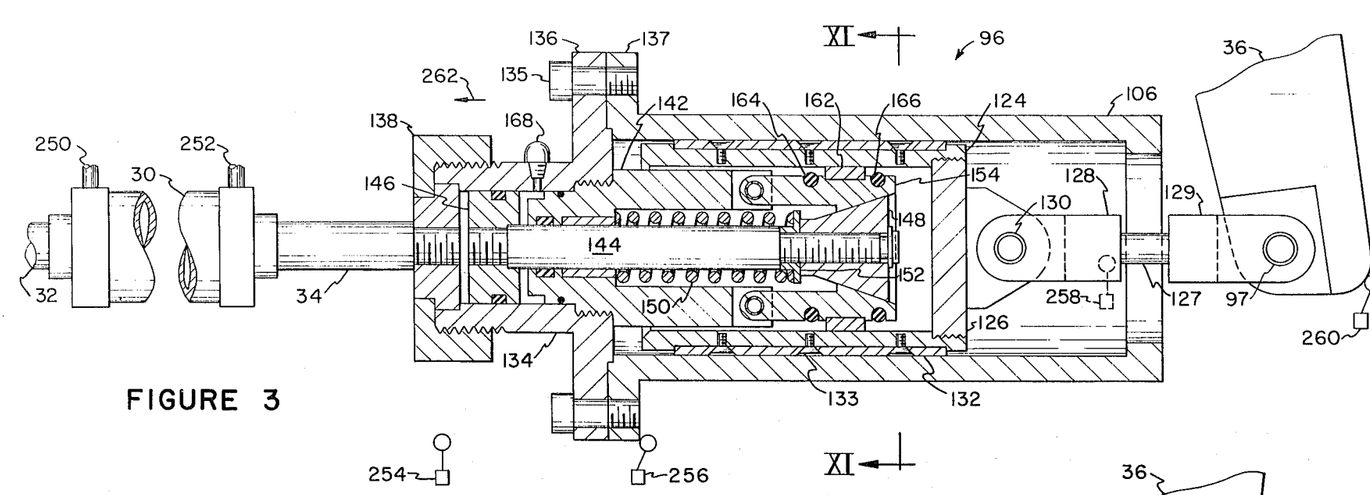
FIG. 3 is the same view as FIG. 2 except showing the second step in sequence of operation of the apparatus.

Engagement of limit switch 256 indicates the conveyor has completed indexing movement and is in position so that kickout 36 can be raised. Referring to FIG. 3 fluid is then supplied to port 168 of collet 96 causing movement of plunger 146 in the direction 262. Expansion member 148 thus moves in the same direction causing segments 154 to expand and join the inner and outer collet members together.

Figure 4:
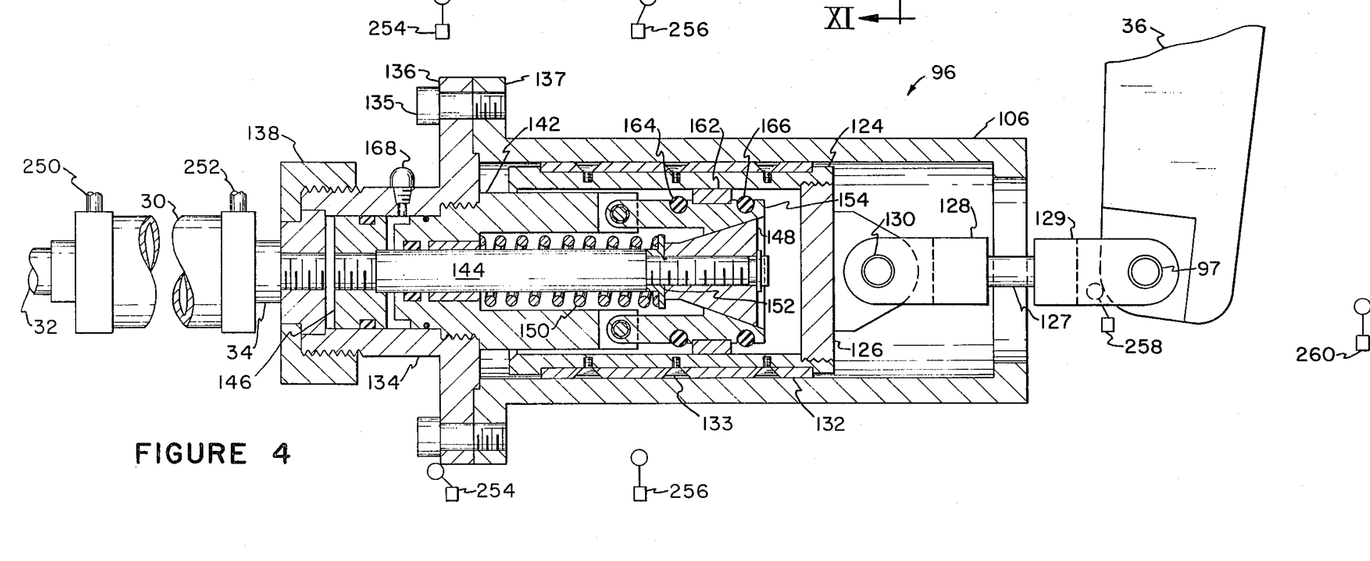
FIG. 4 is the same view as FIG. 2 showing the third step in operation of the apparatus.

Referring to FIG. 4, fluid is then supplied to port 252 of cylinder 30 and exhausted from port 250. This moves rack 48 in the direction 40 (FIG. 1). Since clutch 56 is disengaged when the rack moves in this direction the conveyor remains stationary. However, both the inner and outer members of collet 96 are also moved in direction 40 (FIG. 1) thus causing the kickout arm to be raised. Engagement of limit switches 254 and 258 by the collet and kickout, respectively, indicates the kickout arm has reached the fully raised position.

Figure 5:
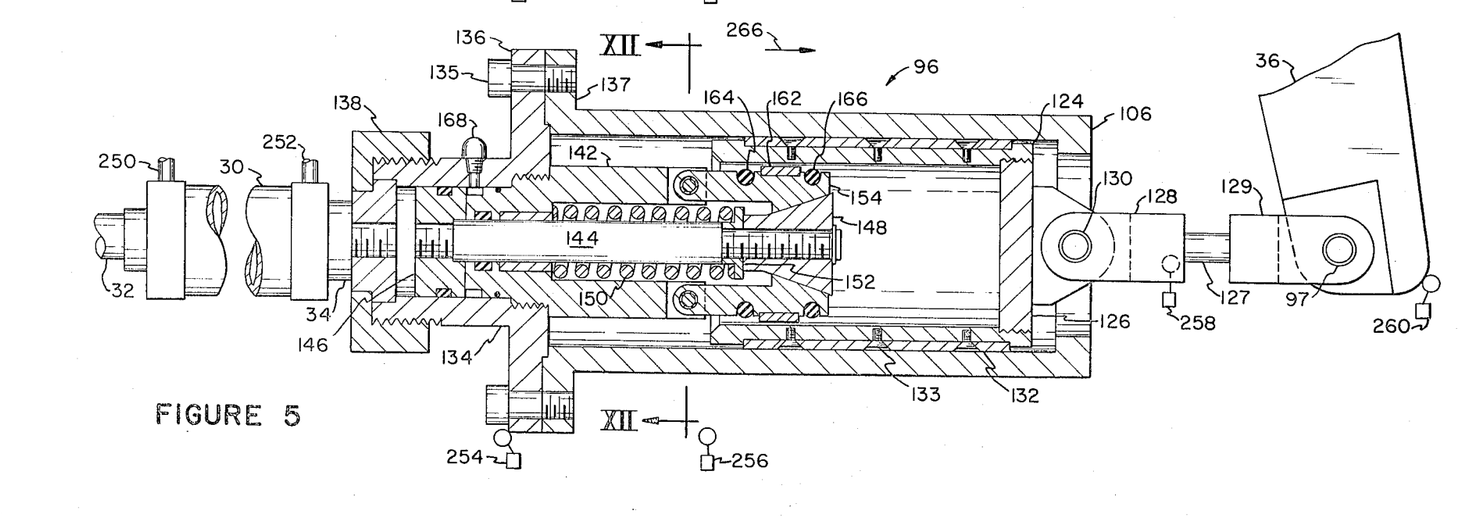
FIG. 5 is the same as FIG. 2 showing the final step in operation of the apparatus.

Referring now to FIG. 5, after the kickout is raised, fluid is then exhausted from port 168 of collet 96. Spring 150 causes expansion member 148 to move in direction 266 allowing segments 154 to collapse and the inner and outer members of the collet to be disconnected. Inner member 124 then moves in direction 266 allowing kickout arm 36 to be retracted to its lowered position. Thus the kickout then engages limit switch 260 indicating the sequence is ready to be repeated.

We claim:

1. Apparatus for driving an endless loop conveyor in indexing fashion and coordinating movement of a kickout arm therewith, said kickout arm being mounted adjacent a delivery end of said conveyor for removing workpieces therefrom, said apparatus comprising:

a double acting fluid powered cylinder means having first and second simultaneously reciprocable piston rods extending from opposite of the ends of said cylinder, said rods each having the axis thereof lying in the plane of said loop means connected to the first of said rods for driving said loop upon movement of said rod in one of the directions of reciprocating movement thereof, said kickout arm having an extension for rotating said arm about the pivot axis thereof from a lowered workpiece receiving position adjacent the end of said conveyor to a raised position for removal of said workpiece from the conveyor, and means for operatively connecting and disconnecting said kickout arm from the second of said cylinder rods so that reciprocation of said rod will pivot said arm only while the conveyor loop is at rest between the intermittent movements thereof.

2. The apparatus of claim 1 wherein said means for connecting said kickout arm to the second of said piston rods includes a collet having concentrically mounted inner and outer elongated elements slidably movable axially with respect to each other, one of said elements being attached to said second piston rod and having the axis thereof coincident with the axis said rod, the other of said elements being pivotally attached to said kickout arm extension, means for selectively connecting said inner and outer elements so as to raise said kickout arm upon movement of said second cylinder rod in one direction and disconnecting said elements for movement of said rod in the opposite direction to allow said kickout arm to move to the lowered position.

3. The apparatus of claim 2 wherein said means for connecting and disconnecting the inner and outer elements includes a plurality of peripheral segments pivotally attached to said inner element, wedge means axially movable in one direction in said inner element for expanding said peripheral segments to connect the inner and outer elements, and axially movable in the opposite axial direction in said inner element for collapsing said peripheral segments to disconnect the elements, and means for selectively moving said wedge means back and forth in said axial directions.

4. The apparatus of claim 1 further comprising quick return means for bringing said kickout arm back to the lowered position after disconnection of said arm from the second piston rod said arm arriving at the lowered position prior to initiation of movement of said second piston rod in the opposite direction from that for raising said kickout arm.

5. The apparatus of claim 4 further comprising means for decelerating the rate of return of said kickout arm in the final portion of travel thereof from the raised to the lowered position.

6. The apparatus of claim 1 wherein said means connected to the first of said rods for driving the loop includes a rack extending axially from said first rod, a pinion engaging said rack and driven therby, and means for operatively connecting said pinion to said loop upon movement of said rod in one direction for driving the conveyor and disconnecting said pinion from said loop upon movement of said rod in the opposite direction.

7. The apparatus of claim 6 further comprising transmission means for adjusting the speed of indexing movement of said conveyor.

* * * * *